Sept. 26, 1950 H. F. PORTER 2,523,515

MAGNETIC TRANSDUCING HEAD

Filed July 28, 1948 2 Sheets-Sheet 1

INVENTOR.
Harry F. Porter
BY
Woodcock and Phelan
Attorneys

Sept. 26, 1950 H. F. PORTER 2,523,515

MAGNETIC TRANSDUCING HEAD

Filed July 28, 1948 2 Sheets-Sheet 2

INVENTOR.
Harry F. Porter
BY
Woodcock and Phelan
Attorneys

UNITED STATES PATENT OFFICE 2,523,515

MAGNETIC TRANSDUCING HEAD

Harry F. Porter, Elkins Park, Pa.

Application July 28, 1948, Serial No. 41,069

6 Claims. (Cl. 179—100.2)

This invention relates to the construction of magnetic heads used with wire or tape-recording equipment for recording, reproduction or erasure.

In general, the magnetic heads used in magnetic recording have been unsatisfactory for one or more of the following reasons: the output voltage in recording or play-back was low, requiring substantial amplification for satisfactory recording or reproduction; their wattage dissipation was low, enforcing use in erasure, of current too low to ensure completeness; the construction was costly, involving a relatively large number of parts, and assembly was difficult, with high percentage of rejects; auxiliary magnetic shielding was required to avoid hum pick-up from adjacent transformers or chokes.

In accordance with the present invention, the magnetic circuit for the head-coil is formed by a casing of magnetic material having high alternating-current permeability at low inductions, the casing serving both as the magnetic circuit of and as the magnetic shield for the coil. More specifically, the coil housing is formed by two telescoping cup or cap-shaped members, one of which has an opening into which extends a core element attached to other of the members, the adjacent edges of the opening and core element providing a narrow air gap over which the wire or tape is moved.

For a more detailed understanding of the invention and for illustration of particular embodiments thereof, reference is made to the accompanying drawings in which.

Figures 1, 2, 3, 4, 5:
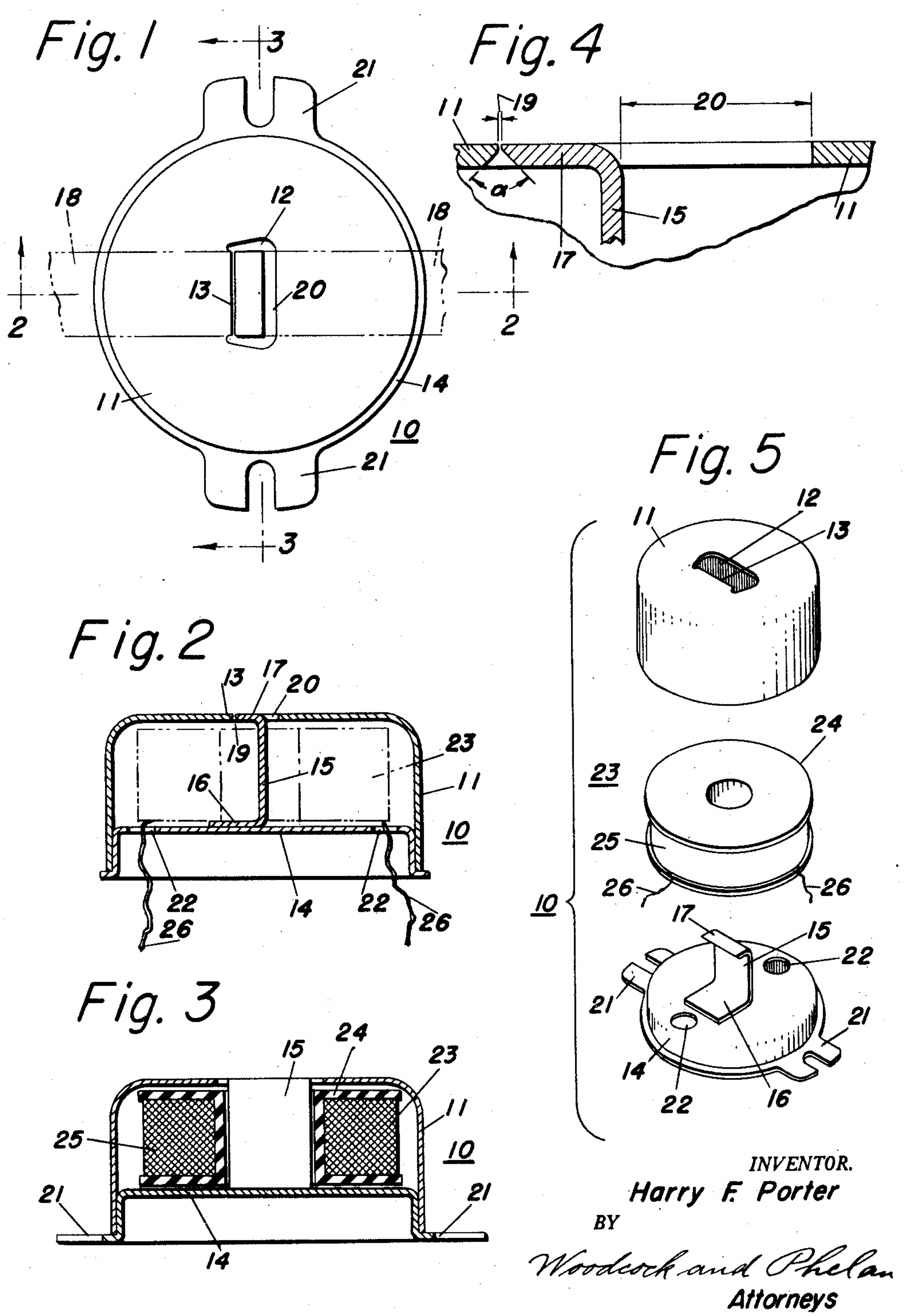
Fig. 1 is a plan view of a magnetic head for use with tape or wire recorders.
Fig. 2 is a sectional view taken on line 2—2 of Fig. 1.
Fig. 3 is a sectional view taken on line 3—3 of Fig. 1.
Fig. 4 is a detail view, on enlarged scale, showing the air gaps in the magnetic head of the preceding figures.
Fig. 5 is an exploded view of the head shown in Figs. 1 to 3.
Figure 6:
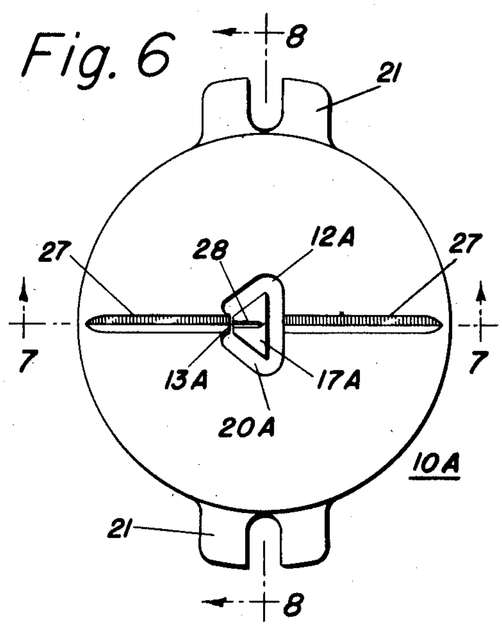
Fig. 6 is a plan view of a magnetic head for wire-recording equipment.

Referring to Figs. 1 to 5, the magnetic head 10 comprises a cup-shaped member 11 of circular or other cross-sectional shape having in its upper face a substantially rectangular opening 12, the edge 13 of which forms one pole tip of the head. By way of example, the diameter on the head may be about 1⅜″ and the thickness of the stock is of the order of 0.020″. The metal is preferably a high-nickel alloy, such as molybdenum "Permalloy," Allegheny-Ludlum "Mumetal," or Carpenter "Hymu," having high alternating-current (A. C.) permeability at low inductions. The shallow cap or cup member 14 which tightly slideably engages the cup member 11 is also of high-nickel alloy and to the face thereof is attached a core strip 15 having a base member 16 welded or otherwise suitably secured to the cap 14. The core 15, a single strip of high-nickel alloy, is provided at its upper end with a flange 17 which forms the second pole tip of the head. The shell members 11, 14 and core member 15 may be easily and rapidly formed from strip stock to exact dimensions by simple press operations.

When the two cup members are assembled, the upper face of the pole flange 17 is flush with the face of the cup member 11 and the free edge of the flange 17 is parallel to and slightly spaced from the edge 13 of the opening 12 in the face of cap 11, leaving an air gap 19 between the pole tips which is very minute, of the order of 0.0005″. The air gap 20 between the flange 17 and the other edges of opening 12 is many times greater, at least 100 times, so to reduce the leakage flux and to provide for high flux density in the air gap 19, Fig. 4, between the pole tips. Preferably prior to assembly, the lower edges of the opposing faces of the pole tips are ground so that when assembled the angle $a$ between them is about 60°; this further serves to concentrate the magnetic flux at the upper edges of the pole tips.

The lugs 21 for mounting the head may be integral with either of the housing members, preferably the shallow cup member 14. The openings 22 in the face of cup member 14 are to permit the coil leads 26 to extend therethrough and also to permit filling of the coil housing with an impregnant which excludes moisture and holds the coil or coil assembly 23 firmly in position.

In assembling the head, the coil assembly 23 is slipped over the core member 15 of the lower cup member 14 and then the upper housing 11 is slipped over the coil and cup 14 to bring the edge 13 of the opening 12 parallel to the free edge of the core flange 17. If necessary, the core member 15 may be bent slightly to obtain the desired width of air gap.

Figure 7:
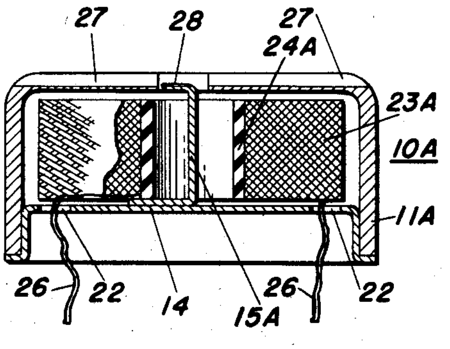
Fig. 7 is a sectional view taken on line 7—7 of Fig. 6.
Figure 10:
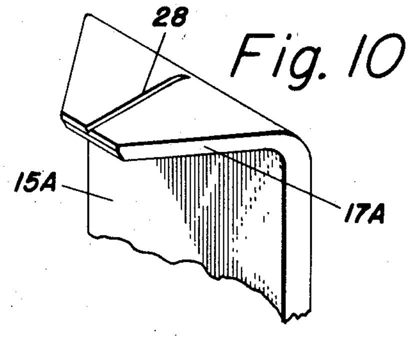
Fig. 10 is a perspective view, on enlarged scale, of part of the core member of Figs. 6 to 9.
Figure 8:
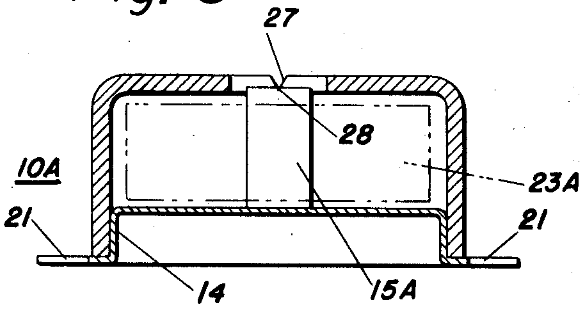
Fig. 8 is a sectional view taken on line 8—8 of Fig. 6.
Figure 9A:
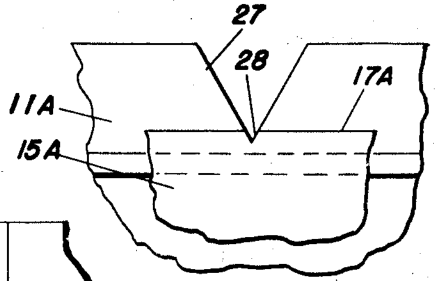
Figs. 9 and 9A are detailed views on enlarged scale showing the air gaps in the magnetic head of Figs. 6 to 8.
Figure 9:
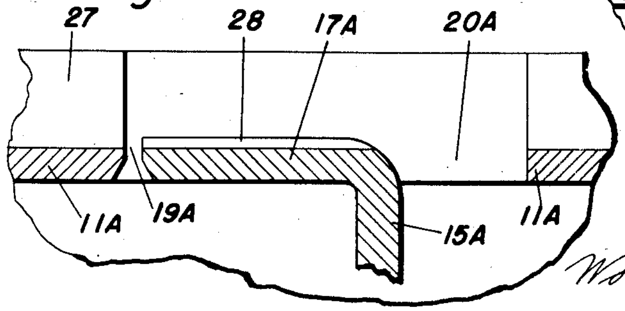

As evident from the foregoing, the head comprises a minimum of parts, and is easily assembled, in contrast with previous types of magnetic heads using tiny lamination which must be stacked to form a core upon which the coil is wound. Furthermore with such prior devices it is difficult to position the parts correctly, and to avoid pick-up from stray fields it is necessary to enclose them in a separate housing of magnetic material. Also with the prior devices, it was necessary to use extremely fine wire, about #50 gauge, whereas with the present construction a much larger-sized wire, for example #36, may be used, and despite use of larger wire the head has a greater number of ampere turns. The impedance of the new head is high, about 15,000 ohms at 1,000 cycles, whereas the impedance of the prior recorder heads is low about 400 ohms at 1,000 cycles. The voltage output of the new head is 7 or 8 times as great as that of previous heads so that recording and reproduction fidelity equal to that of other heads is obtainable with one less amplifier stage; alternately the same number of amplifier stages can be used, affording greater flexibility for tone control by bass or treble boost networks. With the coil 25 scramble wound on bobbin 24, the impedance begins to fall off somewhat at about 7500 cycles, but the frequency range can be extended by using a basket-wound coil 23A such as shown in Fig. 7.

Without any shielding other than that afforded by the magnetic circuit elements 11 and 14 of the coil itself, the immunity to stray fields is equal to or as much as 30% greater than that of prior units using auxiliary shielding. Because of the use of high-nickel alloy for the coil housing, the stray fields of adjacent transformers, filters, chokes and the like but to little extent penetrate the cups 11 and 14 and do not thread the coil 23. The susceptibility of the magnetic head to hum pick-up is therefore low without use of additional or auxiliary magnetic shielding. On the other hand, the high permeability of high-nickel alloy to low alternating current fields insures low reluctance of the magnetic circuit of the coil without need to use stacked laminations with their attendant difficulties and variable magnetic characteristics. Despite the superior performance of applicant's head, its cost is only about one-fourth as much as present magnetic heads.

Furthermore, because the construction permits use of large diameter wire and a large coil, relatively heavy current may be used in erasing prior recordings; specifically the coil shown and described may dissipate as much or more than 4 or 5 watts so obtaining complete erasure without danger of burning out the coil. For impedance-matching purposes, the coil may be tapped and a fewer number of turns used for erasure than for recording or reproduction.

When used with tape recorders, the head 10 is so mounted that the tape 18 moves across the face of cup 11 at right angles to the air gap 19, generally as indicated in broken line in Fig. 1. For use with wire recorders, the head is so positioned that the wire runs across the face of cup 11 in alignment with the air gap 19. However, for wire recording a somewhat different head, shown in Figs. 6 to 10, is preferred. The elements of this modification corresponding in function with, but specifically different from the elements of Figs. 1 to 5 are identified by the same reference characters with addition of a suffix letter.

The cup member 11A, Figs. 6 to 9, is of somewhat heavier stock than cup 11 of Fig. 1; specifically, the thickness may be about 0.060" to allow a V slot 27 to be ground or milled diametrically of its upper face. The core member 15A is also of heavier stock and a V groove 28 is machined in the upper face thereof so that when the parts are assembled the wire is guided by the grooves 27 and 28 to pass across the narrow air gap 19A between the pole face of the core 15A and the pole face 13A formed by one edge of a substantially triangular opening 12A in the face of the upper cap member 11A. In other respects of construction and assembly, the head of Figs. 6 to 10 is similar to that of Fig. 1 and has substantially the same magnetic and electrical characteristics.

It shall be understood the invention is not limited to the particular embodiments disclosed and that changes and modifications may be made within the scope of the appended claims.

What is claimed is:

1. A head for magnetic recording devices comprising a cup-shaped member of magnetic material having high A. C. permeability at low inductions, a cap member of similar material received by said cup-shaped member to form a coil housing, a coil within said housing, one of said members having an opening in the face thereof, and a core member of magnetic material fastened to the other of said members, extending through said coil in fixed position relative thereto and terminating in a pole tip spaced slightly from an edge of said opening.

2. A head for magnetic recording devices comprising a cup-shaped member of magnetic material having high A. C. permeability at low inductions, a cap member of similar magnetic material received by said cup-shaped member to form a coil housing, a coil within said housing, one of said members having an opening in the face thereof, and a solid core member of similar magnetic material fastened to the other of said members, extending through said coil in fixed position relative thereto and terminating in a pole tip spaced slightly from an edge of said opening.

3. A head for magnetic recording devices comprising a cup-shaped member of magnetic material having high A. C. permeability at low inductions and having an opening in the face thereof, a cap member of similar material received by said cup-shaped member to form a coil housing, a coil within said housing, and a core member of magnetic material fastened to said cap member, extending through said coil in fixed position relative thereto and terminating in a pole tip spaced slightly from an edge of said opening in the cup-shaped member.

4. A head for magnetic recording devices comprising two telescoping cup-shaped members forming a coil housing and a magnetic shield for the coil, one of said cup-shaped members having an opening in its face, and a core member of magnetic material fastened to the other of said members, extending through said coil in fixed position relative thereto and terminating in a pole tip spaced slightly from an edge of said opening.

5. A head for magnetic recording devices comprising two cup-shaped members of magnetic material having high A. C. permeability at low inductions, one of said members having an opening in its face, a coil within the housing formed by said cup-shaped members, and a single strip of similar magnetic material fastened to the other of said members, extending through said coil in fixed position relative thereto and terminating in a pole tip spaced slightly from an edge of said opening.

6. A head for magnetic wire-recording devices comprising two cup-shaped members of magnetic material having high A. C. permeability at low inductions, one of said members having an opening in its face, a coil within the housing formed by said cup-shaped members, and a core member of magnetic material fastened to the other of said members, extending through said coil in fixed position relative thereto and terminating in a pole tip spaced slightly from an edge of said opening, said pole tip and said face having a groove for guiding wire across the air gap between said pole tip and said edge.

HARRY F. PORTER.

REFERENCES CITED

The following references are of record in the file of this patent:

UNITED STATES PATENTS

| Number | Name | Date |
| --- | --- | --- |
| 1,142,384 | Tiffany | June 8, 1915 |
| 1,901,331 | Pridham | Mar. 14, 1933 |